(12) United States Patent
Anderson

(10) Patent No.: US 6,383,384 B1
(45) Date of Patent: May 7, 2002

(54) REVERSE OSMOSIS WATER PURIFIER

(76) Inventor: Clifton Gerard Anderson, 11502 Fruitwood Dr., Houston, TX (US) 77089

( * ) Notice: Subject to any disclaimer, the term of this patent is extended or adjusted under 35 U.S.C. 154(b) by 0 days.

(21) Appl. No.: 09/630,852

(22) Filed: Aug. 2, 2000

Related U.S. Application Data

(60) Provisional application No. 60/147,734, filed on Aug. 6, 1999.

(51) Int. Cl.$^7$ ............................................... B01D 63/00
(52) U.S. Cl. ................................ 210/321.84; 210/416.3
(58) Field of Search ..................... 210/321.6, 321.84, 210/416.1, 416.3, 500.21

(56) References Cited

U.S. PATENT DOCUMENTS

| | | |
|---|---|---|
| 4,070,280 A | 1/1978 | Bray |
| 4,125,463 A | 11/1978 | Chenoweth |
| 4,156,645 A | 5/1979 | Bray |
| 4,208,289 A | 6/1980 | Bray |
| 4,288,326 A | 9/1981 | Keefer .......................... 210/637 |
| 4,341,629 A | 7/1982 | Uhlinger ...................... 210/128 |
| 4,421,461 A | 12/1983 | Hicks et al. ................... 417/53 |
| RE32,144 E | 5/1986 | Keefer .......................... 210/637 |
| 4,632,754 A | 12/1986 | Wood ........................ 210/257.2 |
| 4,781,837 A | 11/1988 | Lefebvre ...................... 210/640 |
| 5,229,005 A | 7/1993 | Fok et al. .................... 210/652 |
| 5,520,816 A | 5/1996 | Kuepper ...................... 210/649 |
| 5,531,887 A | 7/1996 | Miers .......................... 210/135 |
| 5,741,416 A | 4/1998 | Tempest, Jr. .................. 210/90 |

Primary Examiner—Robert J. Popovics
(74) Attorney, Agent, or Firm—Harrison & Egbert

(57) ABSTRACT

An apparatus for purifying water that uses a synchronous combination of a worm gear and spring assembly that delivers constant mechanical energy for sustaining continuous filtration operations without the concomitant repetitious cranking that has been commonly prerequisite in the art. A simple means for storing energy as a ready reservoir for pressure-driving an aqueous solution through semipermeable membranes to produce purified water. An electric motor may be provided particularly to support mass production of fresh water from salt water. The electric motor is preferably applied intermittently to engender sufficient energy storage to sustain continuous filtration.

1 Claim, 1 Drawing Sheet

REVERSE OSMOSIS WATER PURIFIER

RELATED APPLICATIONS

Figure 1:
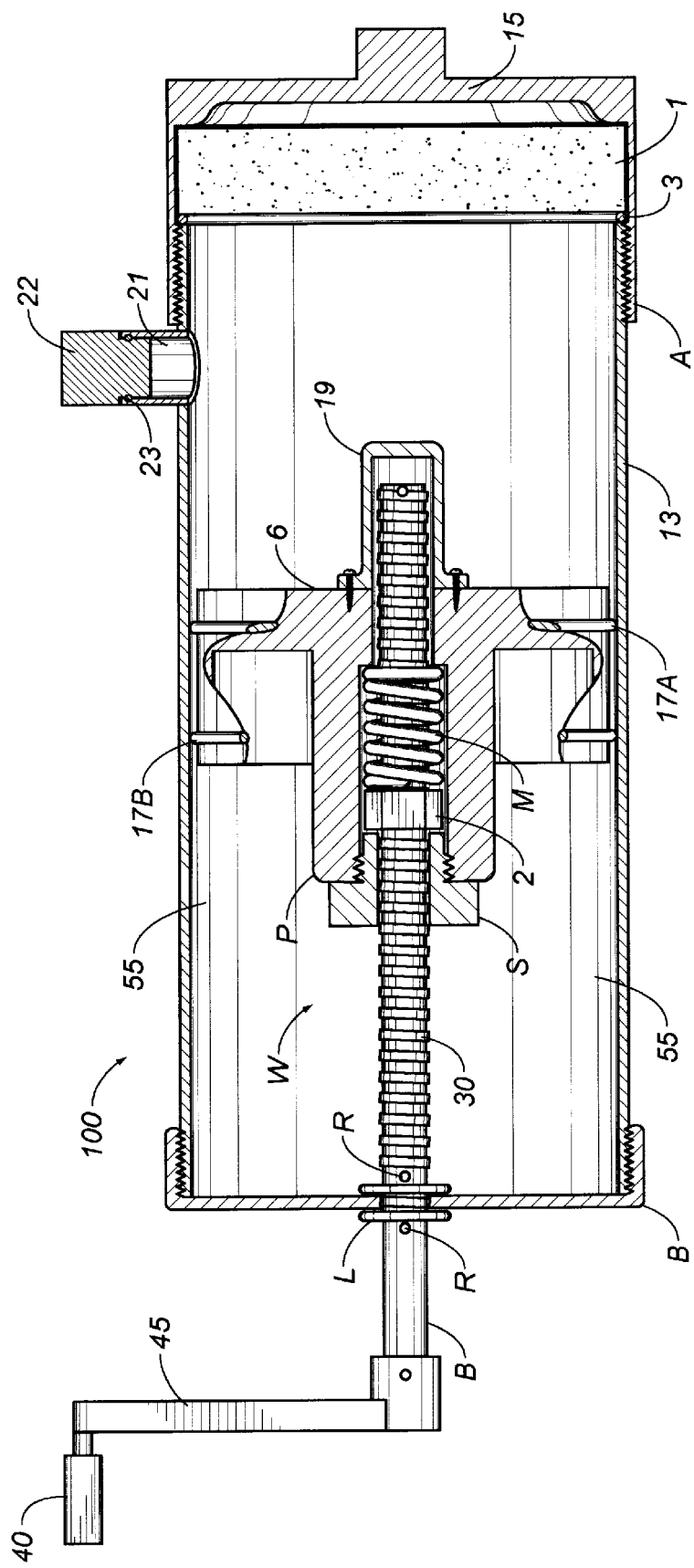

This application claims priority based upon pending U.S. Provisional Application Ser. No. 60/147,734 filed Aug. 6, 1999.

BACKGROUND OF THE INVENTION

This invention relates to water purification, and more particularly relates to purification of water using reverse osmosis purification apparatus and methodology.

As is well known by those skilled in the art, the phenomenon of osmosis may be used to purify water. Generally, reverse osmosis purification apparatus use a pump to develop sufficient pressure to force water through a membrane configured to separate impurities and the like from the water. It is evident that, to sustain such conventional water purification operations using reverse osmosis, constant energy must be applied to the mechanically-driven apparatus.

An illustration of this prior art is a hand-held osmosis apparatus that requires constant cranking effort to provide the energy prerequisite for effectuating the intended water filtration and purification. Thus, Miers discloses in U.S. Pat. No. 5,531,887 a manually-operated reverse osmosis desalination system using semipermeable membranes to selectively purify an aqueous feed solution. A reciprocating piston or diaphragm pump provides the pressure to drive the solution through the membrane thereby continuously flush the membrane surface. Another example of the application of reverse osmosis technology known in the art is disclosed by Tempest's water purification system in U.S. Pat. No. 5,741,416 wherein a booster pump is used to enable the removal of salt and finely divided particles.

Other developments in the reverse osmosis art have been disclosed by Keefer in U.S. Pat. No. 4,288,326 and Pat. No. Re. 32,144. Keefer's apparatus effectuate water desalination using a combination of pump action and a low-speed rotary shaft to selectively permeate purified water from a pressurized feed solution through a semipermeable membrane. The piston means taught by Keefer includes spring-loading means to afford double-acting and reciprocal piston action.

Notwithstanding these and related developments in the art, there appears to be no apparatus which provides an efficient means for both storing and utilizing energy to provide a pump-free driving force prerequisite for sustaining reverse osmosis apparatus and methodology for water purification purposes.

Accordingly, the limitations and disadvantages of the prior art are overcome with the present invention, and improved means and techniques are provided which are useful for effectuating water purification via the application of reverse osmosis but without the necessity of using pump means or for constantly providing mechanical energy to the water purification apparatus.

SUMMARY OF THE INVENTION

The present invention provides a reverse osmosis apparatus for purifying aqueous solutions or contaminated water that uses a synchronous combination of a worm gear and spring assembly that delivers constant mechanical energy for sustaining continuous filtration operations without the concomitant repetitious cranking and the like that has been commonly prerequisite in the art. It will be appreciated by those skilled in the art that embodiments of the present invention afford a simple and pump-free means for storing energy as a ready reservoir for driving an aqueous solution through semipermeable membranes or the like.

In another aspect of the present invention, an electric motor is provided particularly to support mass production of fresh water from salt water and the like. The electric motor is preferably applied to the apparatus taught by the present invention intermittently to engender sufficient energy storage to sustain continuous filtration of particulate impurities and contaminants.

It is an object of the present invention to provide a pump-free apparatus for purifying aqueous solutions via reverse osmosis.

It is another object of the present invention to provide an apparatus for purifying aqueous solutions using reverse osmosis achieved via a Linear configuration of a synchronized drive screw and piston actuated through the rotational motion of a shaft.

It is still another object of the present invention to provide an apparatus for purifying aqueous solutions using reverse osmosis by forcing the solution through a semipermeable membrane under high pressures heretofore unknown in the art.

It is yet another object of the present invention to provide an apparatus for purifying aqueous solutions using reverse osmosis by affording a high mechanical advantage between the pump-free means and synchronized piston means for driving the solution through a semipermeable membrane.

These and other objects and features of the present invention will become apparent from the following detailed description, wherein reference is made to the figures in the accompanying drawings wherein like numerals refer to like components.

IN THE DRAWINGS

FIG. 1 depicts a frontal partial cut-away view of an embodiment of the present invention.

DETAILED DESCRIPTION

Now referring to FIG. 1, there is seen a frontal cut-away view of the preferred embodiment of the present invention. It will be understood by those skilled in the art that the apparatus depicted in FIG. 1 is preferably constructed with a circular cross-section so as to emulate conventional vehicles for accommodating flowing fluid such as pipes and tubes. Reverse osmosis purifier apparatus 100 is depicted with filter membrane means 1 fixedly disposed and attached at one end thereof. More particularly, membrane means 1 is attached at the end portion of cylindrical housing 13 via water outlet port cap means 15. Water outlet cap means 15 is preferably screwably attached to cylindrical housing 13. In a manner well known in the art, cylindrical housing 13 and water outlet cap means 15 are preferably sealed with O-ring 3 when cap means 15 is preferably screwably affixed to housing 13. This sealing point is depicted by numeral A. It will, of course, be understood that use of O-ring 3 or the like assures that the high pressures engendered during operation of the apparatus of the present invention is routinely accommodated.

As will be hereinafter described, the high pressure is manifest within liquid chamber or reservoir 50, disposed generally between piston means 6 and membrane means 1. Piston means 6 is preferably driven by worm gear assembly W that is disposed longitudinally in cylindrical housing 13. Worm gear assembly W comprises shaft B disposed parallel to longitudinal axis of housing 13, synchronizing nut means 2, retainer means S, crank 45 with handle 40, worm gear means 30 circumferentially affixed to shaft B, and spring means M. To minimize friction generated during the conventional manual operation of crank 45 by rotating crank handle 40, to cause rotation of shaft B, cylindrical rear cap means C is preferably constructed with thrust bearing means L. Thrust bearing means L is affixed to shaft B via dowel pin means R. It should be clear that rear cap means C is screwably attached to housing 13 and disposed at the opposite end thereof from cap means 15. It should be evident that air space 55 surrounds the portion of worm gear assembly W contained within housing means 13 but not within aqueous solution reservoir 50.

It will be appreciated that, under the teachings of the present invention, as shaft B is caused to rotate, spring actuator nut means 2 travels along worm gear shaft B as it is caused to turn under the action of crank 45. Spring actuator nut 2 thus advances along corresponding conventional plurality of spiral teeth configured on worm gear means 30. Spring means M is configured in a communication relationship with worm gear means 30 so that the spring means absorbs and stores the mechanical energy as potential energy that is generated via the rotational action of worm gear means 30.

Thus, after liquid chamber 50, disposed between semipermeable membrane means 1 and piston means 6, becomes filled with an aqueous solution contemplated by the present invention, piston 6 under the influence of spring means S is caused to travel synchronously with shaft means B. Since the aqueous solution contained within liquid chamber 50 is incompressible and provides resistance to the penetration of piston means 6 thereinto, piston means 6 inherently travels at a slower speed than the resultant crank speed of shaft B. Salt particles and other particulate impurities are trapped in membrane means 1 and purified water exits through outlet 15 in a manner well known in the reverse osmosis art.

As will be appreciated by those skilled in the art, when the pores of semipermeable membrane means 1 become clogged with extracted particulate wherein extraction of particles and concomitant raffinate water flow is sufficiently inhibited, outflow cap means 15 may be removed and the clogged membrane reversed. Then, after filling chamber 50 with previously purified water, the apparatus of the present invention may be operated wherein the particles captured in the membrane pores may be forcibly removed therefrom under the influence of rapidly-flowing, under-pressure purified exiting water. Then, to resume reverse osmosis water purification with the now cleaned semipermeable membrane, the end cap is removed and the membrane is returned to its normal disposition.

Retainer means S holds worm gear nut means 2 and spring assembly M within piston sleeve means P. It will be understood that during cranking operation, spring actuator nut 2 is caused to push against retainer S which is screwably attached to piston sleeve P. This action, in turn, causes piston means 6 to reset the instant apparatus when spring actuator nut 2 draws against retainer S.

Cell cap 19 sealably attached to the front, open portion of piston 6 provides a channel means for additional longitudinal travel of worm gear means 30 to enable piston 6 to achieve maximal penetration into liquid chamber 50. It will be appreciated that this additional penetration promotes the forced feeding of the aqueous solution into semipermeable membrane 1 under the influence of piston means 6.

Also depicted are front sealing O-ring 17A and corresponding rear sealing O-ring 17B that are affixed to piston means 6. It will be understood that this O-ring pair or the like prevent solution from backing up into air chamber 55. The aqueous salt water solution or the like enters chamber 50 through intake port means 21. Intake port 21 is closed by cap means 22 and sealed with corresponding O-ring 23.

It will be appreciated by those skilled in the art that the efficient, linear synchronous configuration of the worm gear assembly of the present invention enables reverse osmosis to be effectuated under high pressures heretofore unknown in the art. In particular, while the prior art typically achieves pressures on the order of 1200 to 1800 psi obtained using pump means, the present invention is capable of achieving pressures as high as 20,000 psi under a pump-free environment.

It will also be understood that, instead of an embodiment using a manual driver such as a crank means to actuate the worm gear assembly taught by the present invention, an electrical motor or the like may be used to accommodate to sustain mass production operations or the like. Similar to the hand-operated embodiment hereinbefore described in detail, this electrically-driven embodiment would only be operated intermittently, providing sufficient energy to compress the spring means so that aqueous solution contained within the liquid chamber may be effectively moved through the semipermeable membrane as contemplated hereunder.

It will also be understood that the action of the worm gear assembly disclosed herein may be may be selected as appropriate for different applications based upon the separation of the threads affixed thereon and the angulation of these threads. Thus, to achieve greater travel of the actuator nut along the longitudinal shaft in relation to the rotation of the shaft, the threads would be preferably configured to be farther apart and the threads would preferably be configured with greater angles relative to the vertical axis thereof.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the present invention is to be measured by the scope of the appended claims herein.

What is claimed is:

1. A reverse osmosis apparatus for purifying an aqueous solution comprising:

a cylindrical housing having a longitudinal axis;

a worm gear assembly encased with said cylindrical housing and having a central shaft disposed axially of said longitudinal axis;

said housing having a liquid chamber means including a semipermeable membrane means disposed at one end and an air space disposed at the other opposite end, and having an inlet port for receiving said aqueous solution and an outlet port for discharging purified water raffinate obtained from said aqueous solution;

a driving means rotatably attached to and disposed at one end of said worm gear assembly for advancing a worm gear means circumferentially affixed to said central shaft for causing linear movement of an actuator means, rotatabty and screwably disposed upon said worm gear means, communicated to a spring means disposed adjacent said actuator means and also disposed rotatably and screwably disposed upon said worm gear means; and piston means slidably attached to said shaft and disposed between said air space and said liquid chamber, and further disposed concentrically and abutably within said cylindrical housing for forcing said aqueous solution from said liquid chamber through said semipermeable membrane means by using the energy stored in said spring means.

* * * * *